US005851673A

United States Patent [19]

Chen et al.

[11] Patent Number: 5,851,673

[45] Date of Patent: Dec. 22, 1998

[54] TONER FUSER MEMBER HAVING A METAL OXIDE FILLED FLUOROELASTOMER OUTER LAYER WITH IMPROVED TONER RELEASE

[75] Inventors: Jiann H. Chen, Fairport; Tonya D. Binga, Rochester; William J. Staudenmayer, Pittsford, all of N.Y.

[73] Assignee: Eastman Kodak Company, Rochester, N.Y.

[21] Appl. No.: 805,479

[22] Filed: Feb. 25, 1997

[51] Int. Cl.[6] ..................................................... B32B 27/00

[52] U.S. Cl. .............................. 428/421; 430/99; 492/56; 399/324; 399/325; 399/328

[58] Field of Search .............................. 428/421; 430/99; 492/56; 399/324, 325, 328

[56] References Cited

U.S. PATENT DOCUMENTS

| | | | |
|---|---|---|---|
| 4,029,827 | 6/1977 | Imperial et al. | 427/22 |
| 4,101,686 | 7/1978 | Strella et al. | 427/22 |
| 4,185,140 | 1/1980 | Strella et al. | 428/418 |
| 5,017,432 | 5/1991 | Eddy et al. | 428/422 |
| 5,035,950 | 7/1991 | DelRosario | 428/421 |
| 5,141,788 | 8/1992 | Badesha et al. | 428/36.8 |
| 5,157,445 | 10/1992 | Shoji et al. | 355/284 |
| 5,281,506 | 1/1994 | Badesha et al. | 430/124 |
| 5,395,725 | 3/1995 | Bluett et al. | 430/124 |
| 5,464,698 | 11/1995 | Chen et al. | 428/421 |
| 5,512,409 | 4/1996 | Henry et al. | 430/124 |
| 5,516,361 | 5/1996 | Chow et al. | 106/2 |

*Primary Examiner*—Mark Chapman
*Attorney, Agent, or Firm*—Doreen M. Wells

[57] ABSTRACT

A toner fuser member having improved toner release properties comprises a substrate and an outermost layer comprising a cured fluoroelastomer that includes at least about 21 mole percent of hexafluoropropylene (HFP) and at least 10 parts per weight of a metal oxide selected from the group consisting of cupric oxide, plumbous oxide, and mixtures thereof. Applying to the outermost layer of the fuser member an effective amount of a polymethyldisiloxane (PDMS) release agent that, optionally, includes at least one functional group reactive with the fluoroelastomer, followed by incubation at an elevated temperature, produces a surface having enhanced toner release characteristics on the outermost layer. A process for forming a toner fuser member having improved toner release properties comprises forming on a substrate an outermost layer having the above-described composition of cured fluoroelastomer and metal oxide.

24 Claims, No Drawings

TONER FUSER MEMBER HAVING A METAL OXIDE FILLED FLUOROELASTOMER OUTER LAYER WITH IMPROVED TONER RELEASE

FIELD OF THE INVENTION

This invention relates in general to electrostatographic imaging and in particular to members for fusing toner images. More specifically, the invention relates to a fuser member having a metal oxide filled, cured fluoroelastomer outer-most layer with improved toner release properties.

BACKGROUND OF INVENTION

In certain electrostatographic imaging and recording processes such as electrophotographic copying processes, an electrostatic latent image formed on a photoconductive surface is developed with a thermoplastic toner powder which is thereafter fused to a receiver. The fusion step commonly involves directly contacting the substrate, such as a sheet of paper on which toner powder is distributed in an imagewise pattern, with a heated fuser member such as a fuser roller. In most instances, as the powder image is tackified by heat, part of the image carried by the sheet sticks to the surface of the roller so that as the next sheet is advanced, the tackified image partially removed from the first sheet partly transfers to the next sheet and at the same time part of the tackified image from the next sheet adheres to the fuser roller. Any toner remaining adhered to the heated surface can cause a false offset image to appear on the next sheet that contacts the fuser roller and can also degrade the fusing performance of the surface of the member fuser.

To prevent toner offset, many expedients have been tried, for example, providing the fusing roller with an adhesive surface such as a thin coating of an elastomer, e.g., a fluoroelastomer, or a silicone polymer of low surface energy. Also polymeric release agents, e.g., polydiorganosiloxane compounds such as, for example, polydimethylsiloxane oils, have been applied to the fuser roller surface during the operation of the fusing member.

U.S. Pat. Nos. 4,257,699, 4,264,181, 4,272,179, and 5,464,698 to Chen et al, the disclosures of which are incorporated herein by reference, describe fuser rollers having surfaces comprising fluoroelastomers and metal-containing fillers and providing active sites that react with functionalized polymeric release agents, for example, mercapto-functional polydiorganosiloxanes, such as those described in U.S. Pat. No. 4,029,827, the disclosure of which is incorporated herein by reference. The resulting surfaces are adhesive to toner materials, which reduces toner offset. U.S. Pat. Nos. 4,101,686, 4,185,140, 5,157,445, 5,395,725, and 5,512,409, the disclosures of which are incorporated herein by reference, also describe the use of functionalized polymeric release agents with heated fuser members.

U.S. Pat. No. 5,516,361, the disclosure of which is incorporated herein by reference, describes a predominantly monoamino T-type functional oil release agent for application to a fuser member with a hydrofluoroelastomer surface. U.S. Pat. Nos. 5,141,788 and 5,281,506, the disclosures of which are incorporated herein by reference, describe a fuser member having a thin surface layer of organopolysiloxane grafted onto a cured fluoroelastomer in the presence of a dehydrofluorinating agent.

U.S. Pat. No. 5,035,950 to DelRosario, the disclosure of which is incorporated herein by reference, describes a fuser member whose top coat is a fluoroelastomer that includes at least 23.4, and most preferably at least 38.1, mole percent of hexafluoropropylene (HFP). The described fuser member is purported to prevent offset when used alone or with release agents that do not include mercapto terminal groups.

U.S. Pat. No. 5,017,432, the disclosure of which is incorporated herein by reference, describes a fusing surface comprising a fluoroelastomer containing less than 40 mole percent of vinylidene fluoride (VF) and discusses the problem of fluoroelastomers in fuser member surface layers reacting with charge-enhancing additives such as distearyldimethylammonium methylsulfate (DDAMS), which is present in many toner compositions. This reaction causes staining and hardening of the fuser member surface and an increase in surface energy, resulting in irregular wearing of the member surface.

Unfortunately, as fuser rollers wear, fresh active sites that are exposed react not only with the functionalized polymeric agents but also with the paper substrate and with various components of the toner materials such as the aforementioned charge-enhancing additives. Such reaction builds up debris on the surface of the fuser roller, resulting in permanent damage to the surface and greatly reducing the life of the fuser roller. Additionally, the metal-containing filler particles are physically torn from the fuser surface during use, which also reduces the life of the fuser roll. Thus, there remains a need for fuser members for high volume copying applications that have improved toner release properties and robustness, leading to significantly reduced maintenance and replacement costs. The present invention meets this need.

SUMMARY OF INVENTION

In accordance with the invention, a toner fuser member having improved toner release properties comprises a substrate and an outermost layer comprising a cured fluoroelastomer that includes up to about 21 mole percent of hexafluoropropylene (HFP) and at least 10 parts per weight of a metal oxide selected from the group consisting of cupric oxide, plumbous oxide, and mixtures thereof. Applying to the outermost layer of the fuser member an effective amount of a polymethyldisiloxane (PDMS) release agent that, optionally, includes at least one functional group reactive with the fluoroelastomer, followed by incubation at an elevated temperature, produces a surface having enhanced toner release characteristics on the outermost layer.

Further in accordance with the invention, a process for forming a toner fuser member having improved toner release properties comprises forming on a substrate an outermost layer having the above-described composition of cured fluoroelastomer and metal oxide.

DETAILED DESCRIPTION OF INVENTION

In the toner fuser member of the present invention, the outermost layer comprises a cured fluoroelastomer, preferably a terpolymer of vinylidene fluoride (VF), tetrafluoroethylene (TFE), and hexafluoropropylene (HFP), that includes at least about 21 mole percent HFP and, preferably, at least about 50 mole percent VF. Among commercially available fluoroelastomers, Viton materials, obtainable from DuPont, are frequently employed for the fabrication of fuser members . These materials include Viton A, containing 25 mole percent HFP; Viton E45, containing 23 mole percent HFP; and Viton GF, containing 34 mole percent HFP.

A preferred fluoroelastomer for the outermost layer of the fuser member of the present invention is Fluorel FX-9038, available from 3M, containing 52 mole percent VF, 34 mole percent TFE, and 14 mole percent HFP. More preferred is Fluorel FE-5840Q, also available from 3M, containing 53 mole percent VF, 26 mole percent TFE, and 21 mole percent HFP.

At least 10 parts of metal oxide per 100 parts of cured fluoroelastomer are included in the outermost layer of the toner fuser member. The metal oxide may be cupric oxide, plumbous oxide, or mixtures thereof. In a preferred embodiment, 25 to 50 parts of cupric oxide are included in the outermost layer. Alumina may also be included as a thermally conductive filler in the layer; in one embodiment, 120 parts per 100 parts of fluoroelastomer are incorporated.

Although the fuser members of the invention, particularly those with a lower concentration (10 parts) of metal oxide in the outermost layer, exhibit generally good toner offset and release characteristics, these properties may be improved by applying a polydimethylsiloxane (PDMS) release agent to the outermost layer and incubating the fuser member to form a surface that displays enhanced toner release. Preferred PDMS release agents, which include a functional group that is reactive with the floroelastomer, have the formula

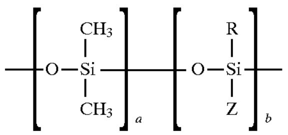

where R is alkyl or aryl, Z is selected from the group consisting of hydrogen, aminoalkyl containing up to about 8 carbon atoms, and mercaptoalkyl containing up to about 8 carbon atoms, and the ratio of a:b is about 1:1 to 3000:1. In more preferred embodiments, Z is hydrogen, aminopropyl, or mercaptopropyl. In a particularly preferred embodiment, Z is hydrogen and the a:b ratio is about 10:1 to 200:1. In another particularly preferred embodiment, Z is aminopropyl and the a:b ratio is about 200:1 to 2,000:1.

An example of a hydrogen-functionalized PDMS release agent is EK/PS-124.5 (available from United Chemical), which contains 7.5 mole percent of the functionalized component and has a viscosity of 225 centistokes. Xerox amino-functionalized PDMS 8R79 contains 0.055 mole percent of an aminopropyl-substituted component and has a viscosity of 300 centistokes. Xerox mercapto-functionalized PDMS 8R2955 contains 0.26 mole percent of a mercaptopropyl-substituted component and has a viscosity of 275 centistokes. A non-functionalized PDMS release oil, DC-200 (from Dow Corning), is useful for purposes of comparison with the functionalized agents and has a viscosity of 350 centistokes.

The composition for the outermost layer of the toner fuser member is prepared by dispersing pre-milled Fluorel FX-9038 (designated Fluoroelastomer A) or Fluorel FE-5840Q (designated Fluoroelastomer B), with stirring for at least 3 hours, in 1:1 methyl ethyl ketone-methyl isobutyl ketone to give a 20–25 weight percent dispersion. The fluoroelastomer dispersion, which includes 3 parts MgO and 6 parts $Ca(OH)_2$ as curing agents, a bisphenol AF cross-linking agent, and an organophosphonium salt accelerator, is combined with cupric oxide and/or plumbous oxide and, optionally, alumina using, for example, a conventional water-cooled two-roll mill.

The fluoroelastomer-metal oxide gum obtained as just described is compression molded into 75-mil test plaques, with curing for 20 minutes at 350° F. (177° C.) under 45 tons pressure and post-curing for 48 hours at 450° F. (232° C.).

The test plaques are employed to evaluate the toner offset and release force characteristics of the outermost layer of the fuser members. A plaque is cut into 1-inch (2.56 cm) squares. One of these squares is left untreated by release agent. To the surface of each of four squares is applied in unmeasured amount, one of the previously mentioned PDMS release oils: non-functionalized release oil DC-200 (designated X); hydrogen-functionalized oil EK/PA-124.5 (designated H); Xerox amino-functionalized PDMS 8R79 (designated A); and Xerox mermcapto-functionalized PDMS 8R2955 (designated M).

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample, including those untreated with release agent, is tested in the following manner:

A 1-inch (2.56-cm) square of paper covered with unfused styrenebutyl acrylate toner is placed in contact with a sample on a bed heated to 175° C., and a pressure roller set for 80 psi is locked in place over the laminate to form a nip. After 20 minutes the roller is released from the laminate.

The extent of offset for each sample is determined by microscopic examination of the sample surface following delamination. The following numerical evaluation, corresponding to the amount of toner remaining on the surface, is employed.

| | |
|---|---|
| 1 | 0% offset |
| 2 | 1–20% offset |
| 3 | 21–50% offset |
| 4 | 51–90% offset |
| 5 | 91–100% offset |

Qualitative assessment of the force required for delamination of the paper from the sample is as follows:

| | |
|---|---|
| 1 | low release force |
| 2 | moderate release force |
| 3 | high release force |

The following examples further illustrate the invention:

EXAMPLE 1

Evaluation of outermost layer compositions with Fluoroelastomer A

Test results from compositions prepared from Fluorelastomer A (52 mole percent VF, 34 mole percent TFE, 14 mole percent HFP), including a control composition 10 containing no metal oxide, are given in Section A of TABLE 1.

Inclusion of 10 parts of either PbO (composition 11) or CuO (composition 12) results in improved offset properties compared with composition 10 when no release agent or when non-functionalized oil X is applied. Excellent toner offset and release results are obtained with compositions 14–16, which contain 25 to 50 parts CuO, that have been treated with either hydrogen-functionalized oil H or amino-functionalized oil A. Very good results are obtained with compositions 14–16 to which non-functionalized oil X and mercapto-functionalized oil M have been applied.

EXAMPLE 2

Evaluation of outermost layer compositions with Fluoroelastomer B

Test results from compositions prepared from Fluoroelastomer B (53 mole percent VF, 26 mole percent TFE, 21 mole percent HFP), including a control composition 20 containing no metal oxide, are given in Section B of TABLE 1.

As with the corresponding compositions described in Example 1, inclusion of 10 parts PbO (composition 21) or 10 parts CuO (composition 24) improves toner release compared to control 20 with no oil or with X oil treatment.

Inclusion of 120 parts $Al_2O_3$ (compositions 22–23, 25–26) causes a degradation of offset-release performance with no oil or X oil treatment, but the use of mercapto oil M produces generally improved results for the $Al_2O_3$-containing compositions. Excellent results are obtained with the CuO-containing samples, both with and without $Al_2O_3$ (samples 24–26), that have been treated with either hydrogen-functionalized oil H or amino-functionalized oil A.

TABLE 1

| Composition No. | Parts metal oxide per 100 parts of fluoroelastomer | Offset - Release Release oil No Oil | X | H | A | M |
|---|---|---|---|---|---|---|
| A. Fluoroelastomer A (52 VF, 34 TFE, 14 HFP) | | | | | | |
| 10 (control) | None | 3-3 | 4-3 | 2-2 | 2-1 | 1-1 |
| 11 | 10 PbO | 2-2 | 2-2 | 3-3 | 2-2 | 2-3 |
| 12 | 10 CuO | 2-3 | 1-3 | 1-2 | 1-1 | 3-3 |
| 13 | 15 CuO | 4-3 | 2-2 | 1-3 | 1-2 | 2-2 |
| 14 | 25 CuO | 4-3 | 1-3 | 1-1 | 1-1 | 1-2 |
| 15 | 35 CuO | 4-3 | 2-3 | 1-1 | 1-1 | 1-2 |
| 16 | 50 CuO | 4-3 | 1-2 | 1-1 | 1-1 | 1-2 |
| B. Fluoroelastomer B (53 VF, 26 TFE, 21 HFP) | | | | | | |
| 20 (control) | None | 4-3 | 3-3 | 2-2 | 1-1 | 1-2 |
| 21 | 10 PbO | 1-2 | 1-1 | 1-3 | 1-1 | 1-3 |
| 22 | 10 PbO (+ 120 $Al_2O_3$) | 4-3 | 2-3 | 2-3 | 2-2 | 1-1 |
| 23 | 30 PbO (+ 120 $Al_2O_3$) | 3-3 | 3-2 | 2-3 | 2-2 | 1-1 |
| 24 | 10 CuO | 2-2 | 2-3 | 1-1 | 1-2 | 1-2 |
| 25 | 10 CuO (+ 120 $Al_2O_3$) | 2-3 | 2-3 | 1-1 | 1-1 | 1-1 |
| 26 | 30 CuO (+ 120 $Al_2O_3$) | 3-3 | 3-3 | 1-1 | 1-1 | 2-2 |

EXAMPLE 3

Evaluation of charge agent stain generation in compositions

As previously mentioned, ionic charge-enhancing additives that are present in many toner compositions undergo a stain-producing reaction at high temperature with fluoroelastomers included in a fuser member surface layer.

Particles of the quaternary ammonium charge-control agent T-77 (available from Hodogaya) are lightly sprinkled on the surface of samples control composition 10 and CuO-containing compositions 12–16 (with no oil treatment) listed in Section A of TABLE 1. The samples are heated for 24 hours at 350° F. (177° C.), which results in formation of a pink stain on the surface of the sample of control composition 10. The surfaces of samples containing compositions 12–16, on the other hand, are not stained under these conditions, demonstrating a further advantage of the present invention.

The invention has been described in detail with particular reference to preferred embodiments thereof, but it will be understood that variations and modifications can be effected within the spirit and scope of the invention.

What is claimed is:

1. A toner fuser member having improved toner release properties, said fuser member comprising:

a substrate;

an outermost layer comprising 100 parts by weight of a cured fluoroelastomer that includes at least about 21 mole percent of hexafluoropropylene (HFP) and at least 10 parts by weight of a metal oxide selected from the group consisting of cupric oxide, plumbous oxide, and mixtures thereof; and a polydimethylsiloxane (PDMS) release agent applied to said outermost layer in an amount effective to produce, upon incubation at elevated temperature, a surface having improved toner release properties on said outermost layer.

2. The toner fuser member of claim 1 wherein said fluoroelastomer is a terpolymer of vinylidene fluoride (VF), tetrafluoroethylene (TFE), and hexafluoropropylene (HFP).

3. The toner fuser member of claim 2 wherein said fluoroelastomer comprises at least 50 mole percent of vinylidene fluoride (VF).

4. The toner fuser member of claim 3 wherein said fluoroelastomer comprises about 53 mole percent of vinylidene fluoride (VF), about 26 mole percent of tetrafluoroethylene (TFE), and at least about 21 mole percent of hexafluoropropylene (HFP).

5. The toner fuser member of claim 2 wherein said outermost layer comprises about 25 to 50 parts by weight of cupric oxide.

6. The toner fuser member of claim 1 wherein said outermost layer further comprises alumina.

7. The toner fuser member of claim 6 wherein said outermost layer includes about 120 parts by weight of alumina.

8. The toner fuser member of claim 1 wherein the PDMS release agent includes an aminoalkyl functional group reactive with said fluoroelastomer.

9. The toner fuser member of claim 8 wherein said PDMS release agent has the formula

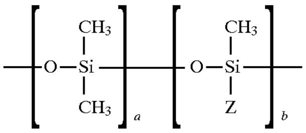

wherein Z is aminoalkyl containing up to about 8 carbon atoms, and the ratio of a:b is about 1:1 to 3000:1.

10. The toner fuser member of claim 9 wherein Z is aminopropyl.

11. The toner fuser member of claim 10 wherein Z is aminopropyl and the a:b ratio is about 200:1 to 2000:1.

12. The toner fuser member of claim 1, further containing at least one curing agent.

13. The toner fuser member of claim 1, further containing a cross-linking agent and an accelerator.

14. A process for forming a toner fuser member having improved toner release properties, said process comprising:

forming an outermost layer on a fuser member substrate, said outermost layer comprising 100 parts by weight of a cured fluoroelastomer that includes at least about 21 mole percent of hexafluoropropylene (HFP) and at least 10 parts by weight of a metal oxide selected from the group consisting of cupric oxide, plumbous oxide, and mixtures thereof;

applying to said outermost layer an effective amount of a polydimethylsiloxane (PDMS) release agent; and incubating the toner fuser member under conditions effective to form on said outermost layer a surface having improved toner release properties.

15. The process of claim 14, further adding at least one curing agent.

16. The process of claim 15 wherein said fluoroelastomer comprises about 53 mole percent of vinylidene fluoride (VF), about 26 mole percent of tetrafluoroethylene (TFE), and at least about 21 mole percent of hexafluoropropylene (HFP).

17. The process of claim 16 wherein said PDMS release agent has the formula

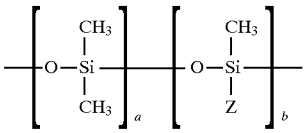

wherein Z is aminoalkyl containing up to about 8 carbon atoms, and the ratio of a:b is about 1:1 to 3000:1.

18. The process of claim 17 wherein Z is aminopropyl.

19. The process of claim 17 wherein the a:b ratio is about 200:1 to 2000:1.

20. The process of claim 14, further adding a cross-linking agent and an accelerator.

21. The process of claim 14 wherein said fluoroelastomer is a terpolymer of vinylidene fluoride (VF), tetrafluoroethylene (TFE), and hexafluoropropylene (HFP).

22. The process of claim 14 wherein said outermost layer comprises about 25 to 50 parts by weight of cupric oxide.

23. The process of claim 14 wherein said PDMS release agent includes an aminoalkyl functional group reactive with said fluoroelastomer.

24. The process of claim 14 wherein said incubating is carried out at a temperature of about 150° C. and 200° C. for a period of about 8 hours to 24 hours.

* * * * *